(12) United States Patent
De Oto et al.

(10) Patent No.: US 8,610,378 B2
(45) Date of Patent: Dec. 17, 2013

(54) LED ANTI-COLLISION LIGHT HAVING A XENON ANTI-COLLISION LIGHT POWER SUPPLY

(75) Inventors: Len De Oto, Springfield, OH (US); Don Kulasekera, Springfield, OH (US); Brian Barnhart, New Carlisle, OH (US)

(73) Assignee: Honeywell International Inc., Morristown, NJ (US)

( * ) Notice: Subject to any disclaimer, the term of this patent is extended or adjusted under 35 U.S.C. 154(b) by 217 days.

(21) Appl. No.: 13/296,959

(22) Filed: Nov. 15, 2011

(65) Prior Publication Data

US 2012/0126698 A1    May 24, 2012

Related U.S. Application Data

(60) Provisional application No. 61/416,180, filed on Nov. 22, 2010.

(51) Int. Cl.
*H05B 37/02* (2006.01)
*H05B 39/04* (2006.01)
*H05B 41/36* (2006.01)

(52) U.S. Cl.
USPC ..... 315/360; 315/129; 315/241 P; 315/241 S; 315/291

(58) Field of Classification Search
None
See application file for complete search history.

(56) References Cited

U.S. PATENT DOCUMENTS 7,645,053 B2 * 1/2010 Machi et al. ............ 362/241
2012/0319860 A1 * 12/2012 Savage, Jr. ............ 340/691.8

* cited by examiner

*Primary Examiner* — Anh Tran
(74) *Attorney, Agent, or Firm* — Ingrassia Fisher & Lorenz, P.C.

(57) ABSTRACT

Methods and systems for easily integrating a light-emitting diode (LED) light assembly with an existing xenon power supply. An exemplary system includes a xenon power supply that includes an energy storage device and a device that commands the energy storage device to discharge the stored energy and transmit a trigger signal after a predefined amount of time since at least one of a previous discharge or a beginning of initial charge of the energy storage device. The LED light assembly includes one or more LEDs and a current regulator that receives the discharge from the storage device and regulates current to the LEDs based on LED requirements. The LED light assembly also includes a processing device that receives the trigger signal, resets and begins a timer upon reception of the trigger signal and deactivates the current regulator when the timer has reached predefined threshold.

11 Claims, 8 Drawing Sheets

LED ANTI-COLLISION LIGHT HAVING A XENON ANTI-COLLISION LIGHT POWER SUPPLY

PRIORITY CLAIM

This application claims the benefit of U.S. Provisional Application Ser. No. 61/416,180 filed Nov. 22, 2010, the contents of which are hereby incorporated by reference.

BACKGROUND OF THE INVENTION

Figure 1:
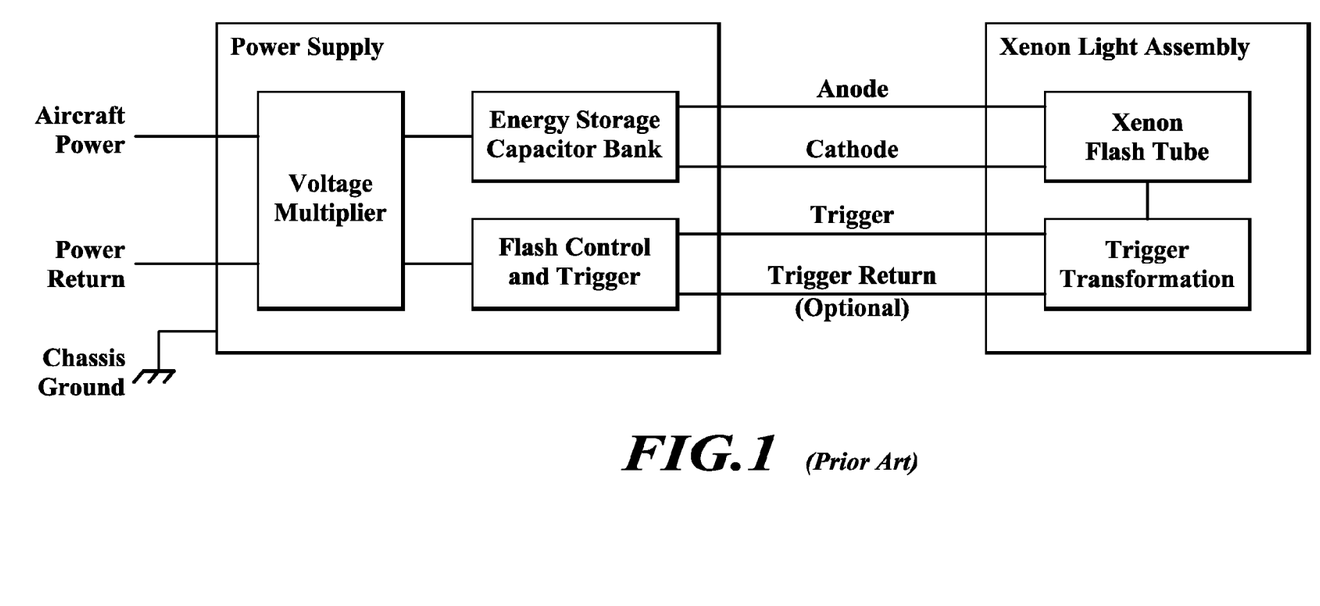
FIGS. 1 and 2 show prior art anti-collision lighting systems.

FIG. 1 illustrates a block diagram of a xenon anti-collision lighting system formed in accordance with an embodiment of the prior art. A power supply regulates energy in an energy storage capacitor bank. A trigger pulse causes capacitor energy to be discharged through the xenon lamp. There does not exist a control of flash duration of the xenon light.

Figure 2:
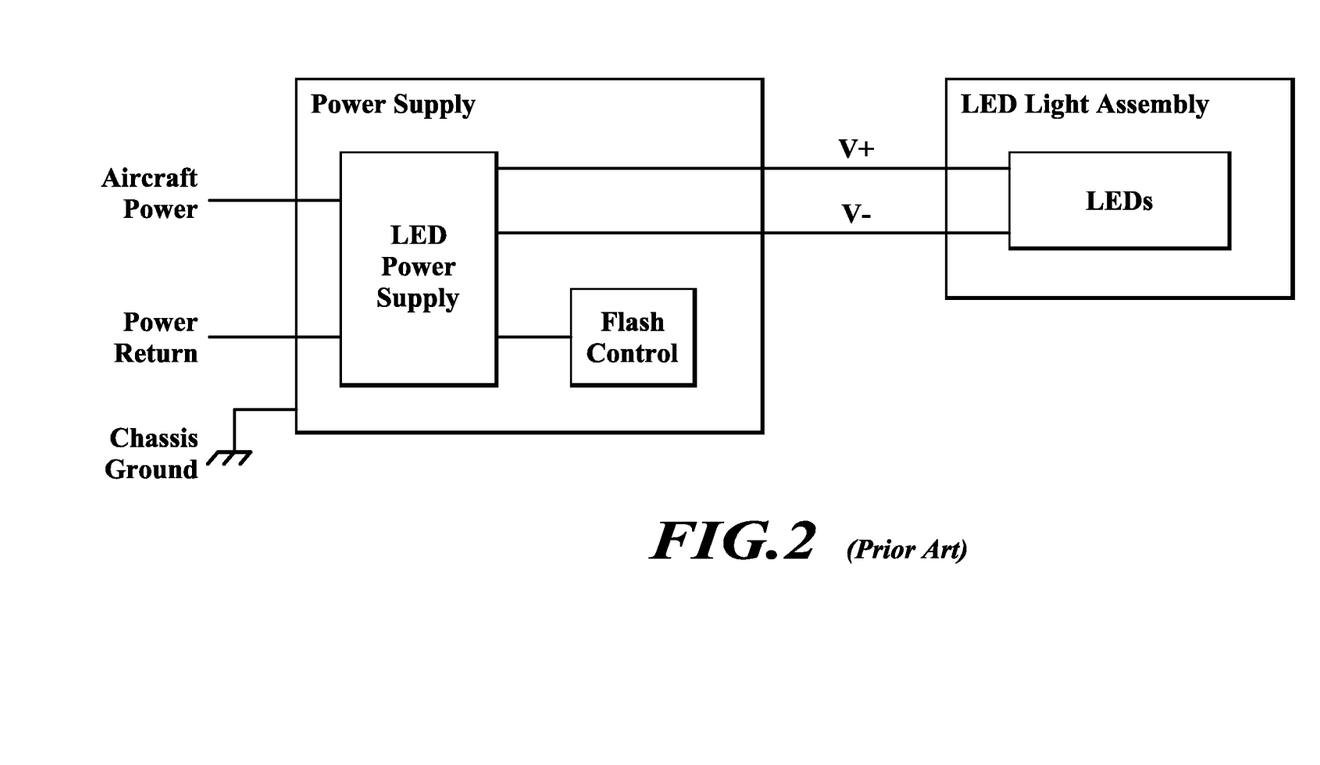

Xenon, like other light solutions, have high energy usage and limited life span as compared to light-emitting diode (LED) systems. However, replacing a xenon system with an LED anti-collision lighting system (e.g. FIG. 2) would require significant maintenance time (i.e. aircraft downtime) in order to swap out the xenon power supply for the LED power supply and would require significant cost and time for development of a new LED power supply.

SUMMARY OF THE INVENTION

The present invention provides methods and systems for easily integrating a light-emitting diode (LED) light assembly with an existing xenon power supply. An exemplary system includes a xenon power supply that includes an energy storage device and a device that transmits a trigger signal after a predefined amount of time since at least one of a previous discharge or a beginning of initial charge of the energy storage device. The LED light assembly includes one or more LEDs and a current regulator that receives the energy from the storage device and regulates current to the LEDs based on LED requirements. The LED light assembly also includes a processing device that receives the trigger signal, resets and begins a timer upon reception of the trigger signal and deactivates the current regulator when the timer has reached a predefined threshold to control the LED flash duration.

By using the present invention, the life span of an existing xenon power supply and capacitor bank can be greatly extended potentially eliminating the scheduled costly capacitor bank replacement.

In one aspect of the invention, instead of a timer at the LED light assembly a voltage monitor monitors the received voltage from the storage device and causes deactivation of the current regulator when the monitored voltage reaches a predefined threshold value.

BRIEF DESCRIPTION OF THE DRAWINGS

Preferred and alternative embodiments of the present invention are described in detail below with reference to the following drawings.

DETAILED DESCRIPTION OF THE INVENTION

The present invention allows use of existing xenon tube-based strobe (e.g. anti-collision) light system power supply that supplies power to a light-emitting diode (LED) light assembly. The LED light assembly includes circuit components for converting capacitive discharge energy produced by the existing xenon system power supply into appropriate voltage, current, and time parameters for properly powering the LED light assembly.

Figure 3:
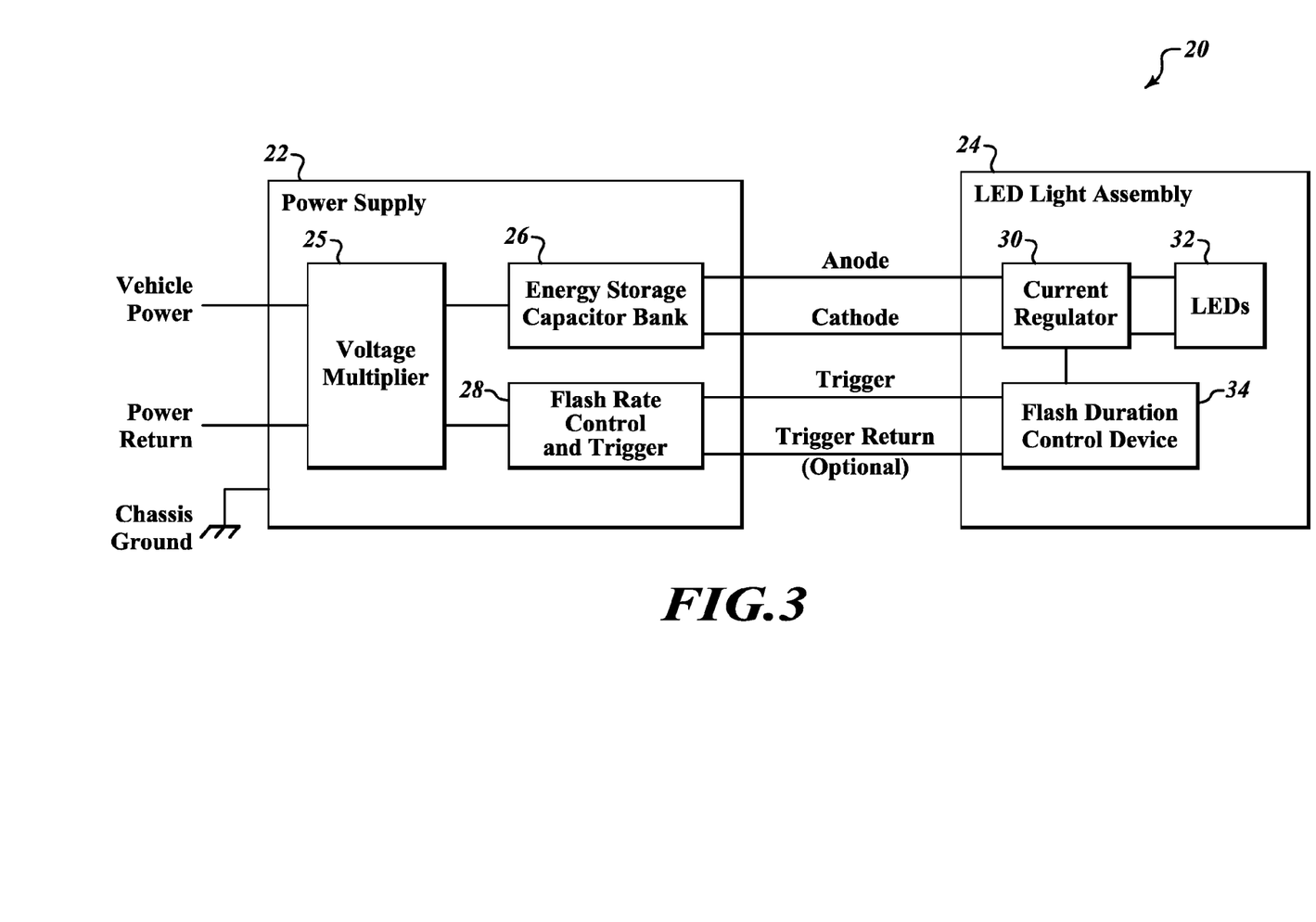
FIG. 3 is a block diagram of an exemplary system formed in accordance with an embodiment of the present invention.

FIG. 3 shows an exemplary LED anti-collision light system 20 having a xenon anti-collision light power supply 22 and an LED light assembly 24. An example xenon anti-collision light power supply 22 is produced by Honeywell, Inc. The power supply 22 includes a voltage multiplier 25, an energy storage capacitor bank 26, and a flash rate control and trigger device 28. The power supply flash rate control and trigger device 28 signals for the start of a flash of the LEDs and controls flash rate.

The LED light assembly 24 includes a current regulator 30, one or more LEDs 32, and a flash duration control device 34. The flash duration control device 34 may be a processing device that executes flash duration control logic stored in a memory device. The current regulator 30 is connected to the anode and cathode of the capacitor bank 26, the one or more LEDs 32, and the flash duration control device 34. The flash duration control device 34 receives a trigger signal from the flash rate control and trigger device 28. Current and flash duration of LEDs 32 are controlled by the current regulator 30 and the flash duration control device 34 from power received from the capacitor bank 26 and the trigger signal received from the power supply flash rate control and trigger device 28.

In another embodiment, the LED light assembly 24 provides a trigger return from the flash duration control device 34 to the flash rate control and trigger device 28. The trigger return is used between the xenon light power supply and the LED light assembly 24 to provide greater signal integrity.

Figure 4:
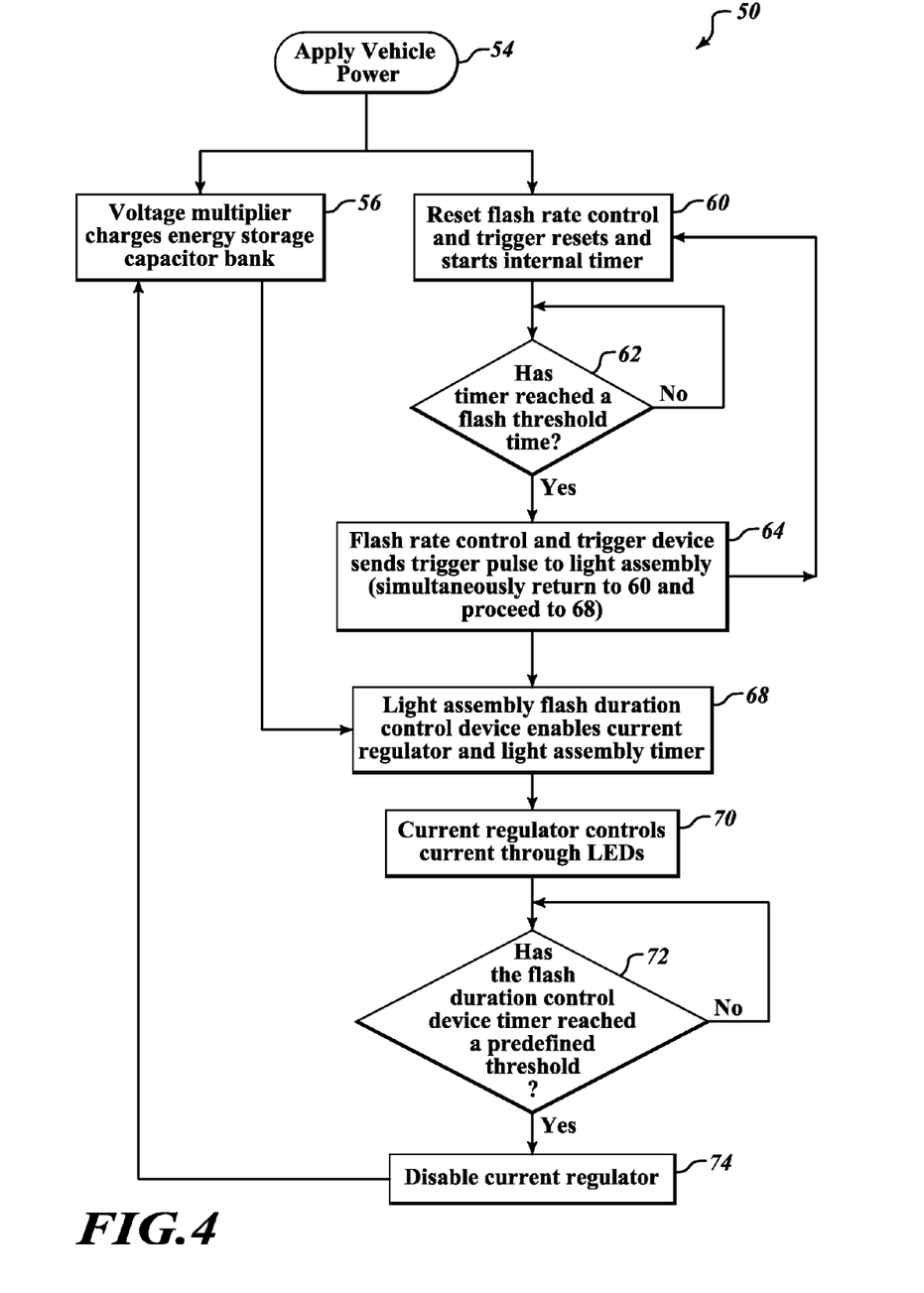
FIG. 4 is a flow diagram of an exemplary process performed by the system shown in FIG. 3.

FIG. 4 illustrates a flowchart of an exemplary process 50 performed by the system 20 shown in FIG. 3. First, at start symbol 54, power from the vehicle (e.g. aircraft, ground vehicle, submergible vessel, or surface vessel) is applied to the light system 20. At a block 56, the voltage multiplier 25 charges the capacitor bank 26. Simultaneously, at a block 60, the power supply flash rate control and trigger device 28 resets and starts a timer internal to the flash rate control and trigger device 28. Then, at a decision block 62, the power supply flash rate control and trigger device 28 determines when the timer has reached a predefined flash threshold time. If the timer has reached the predefined flash threshold time, then, at a block 64, the power supply flash rate control and trigger device 28 sends a trigger pulse to the light assembly 24. At a block 68, the flash duration control device 34 receives the trigger then enables the current regulator 30, thus causing the capacitor bank 26 to discharge, and starts a timer in the flash duration control device 34. At a block 70, the enabled current regulator 30 controls current through the LEDs 32. Then, at a decision block 72, the flash duration control device 34 determines if its internal timer has reached a predefined threshold. If the flash control logic timer has reached the predefined threshold, then at block 74 the flash duration control device 34 disables the current regulator 30. Before the timer of the flash duration control device 34 reaches the predefined threshold, the current regulator 30 controls current outputted by the discharging capacitor bank 26. The process 50 repeats for continued operation of the LED anti-collision light system 20.

Figure 5:
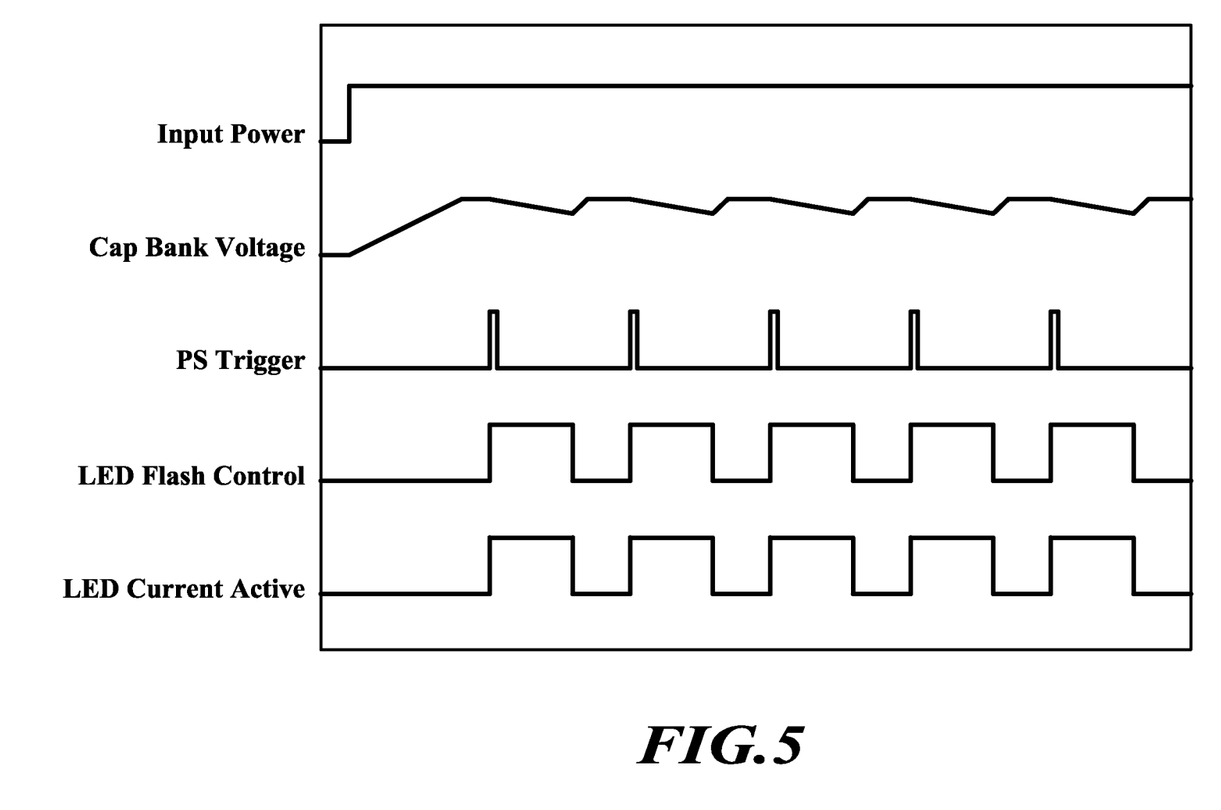
FIG. 5 is a timing diagram for the system shown in FIG. 3.

FIG. 5 is a timing diagram for the system 20 shown in FIG. 3. The PS trigger is the trigger signal from the power supply 22. The LED current active signal indicates when the current regulator 30 is enabled.

Figure 6:
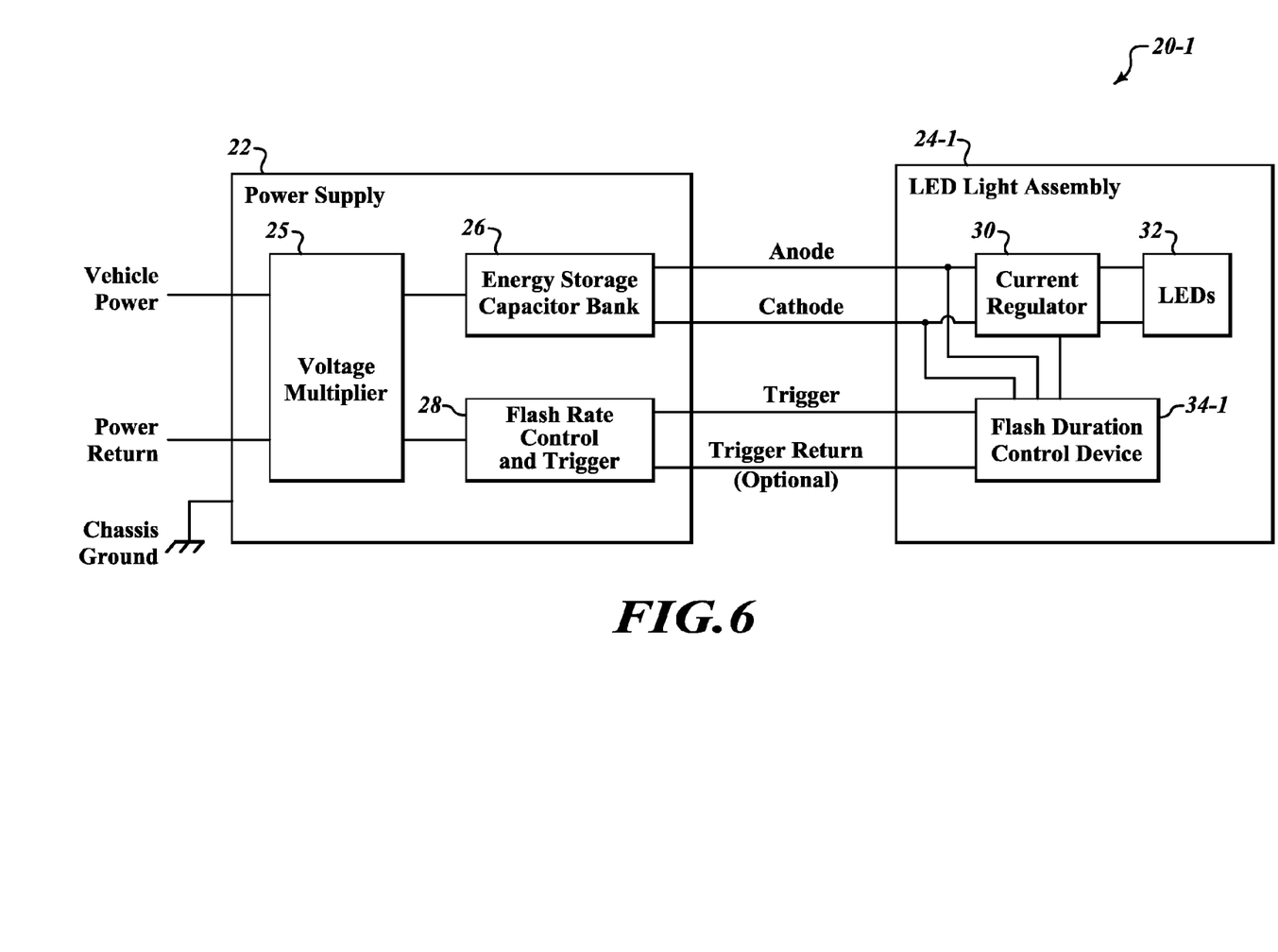
FIG. 6 a block diagram of an exemplary system formed in accordance with an alternate embodiment of the present invention.

FIG. 6 shows an exemplary LED anti-collision light system 20-1 having a xenon anti-collision light power supply 22 and an LED light assembly 24-1. The xenon anti-collision light power supply 22 is the same as that in the system 20 of FIG. 3.

The LED light assembly 24-1 includes a current regulator 30, one or more LEDs 32, and a flash duration control device 34-1. The flash duration control device 34-1 may be a processing device that executes flash control logic stored in a memory device. The current regulator 30 is connected to the anode and cathode of the capacitor bank 26, the one or more LEDs 32, and the flash duration control device 34-1. The flash duration control device 34-1 receives a trigger signal from the flash rate control and trigger device 28 and signals from the anode and cathode of the capacitor bank 26. Current and flash duration of LEDs 32 are controlled by the current regulator 30 and the flash duration control device 34-1 from power received from the capacitor bank 26 and the trigger signal received from the power supply flash rate control and trigger device 28.

Figure 7:
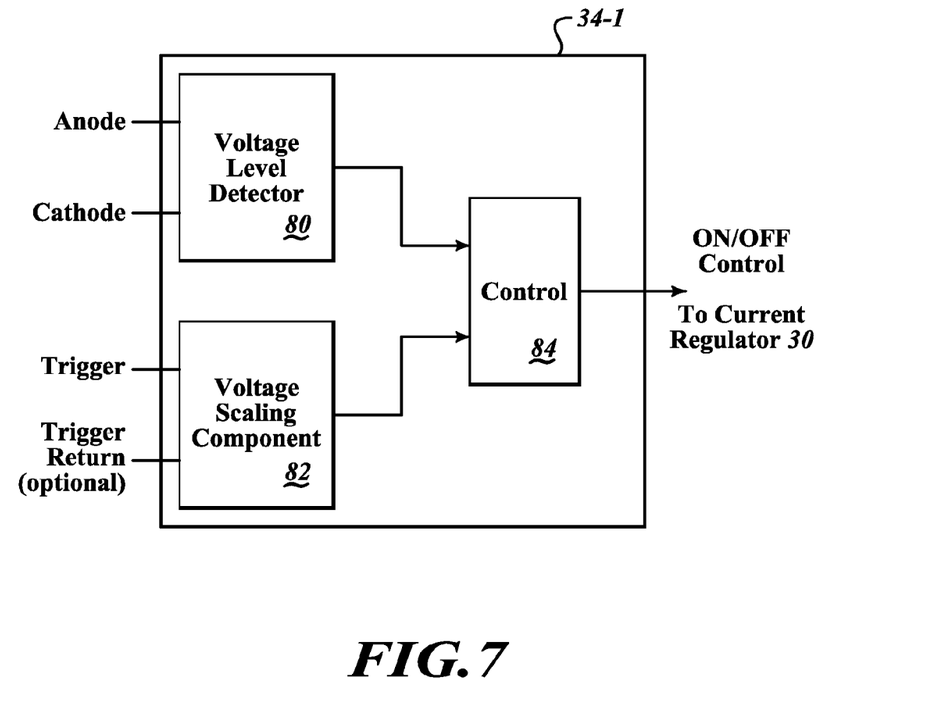
FIG. 7 is an alternate flash duration control device.

FIG. 7 shows exemplary details of the flash duration control device 34-1, which includes a voltage level detector 80, a voltage scaling component 82 and a control device 84. The voltage level detector 80 is coupled to the anode and cathode of the capacitor bank 26. The voltage level detector 80 detects the voltage level between the anode and cathode and sends the detected voltage level information to the control device 84. The voltage scaling component 82 receives the trigger signal from the power supply 22. The voltage scaling component 82 adjusts the trigger signal received from the power supply 22 to be within the common mode range of the control device 84. The control device 84 generates and sends an enable signal to the current regulator 30 when the trigger signal is received from the voltage scaling component 82. The control device 84 generates and sends a disable signal to the current regulator 30 when the detected voltage level information from the voltage level detector 80 falls below a predefined threshold.

Figure 8:
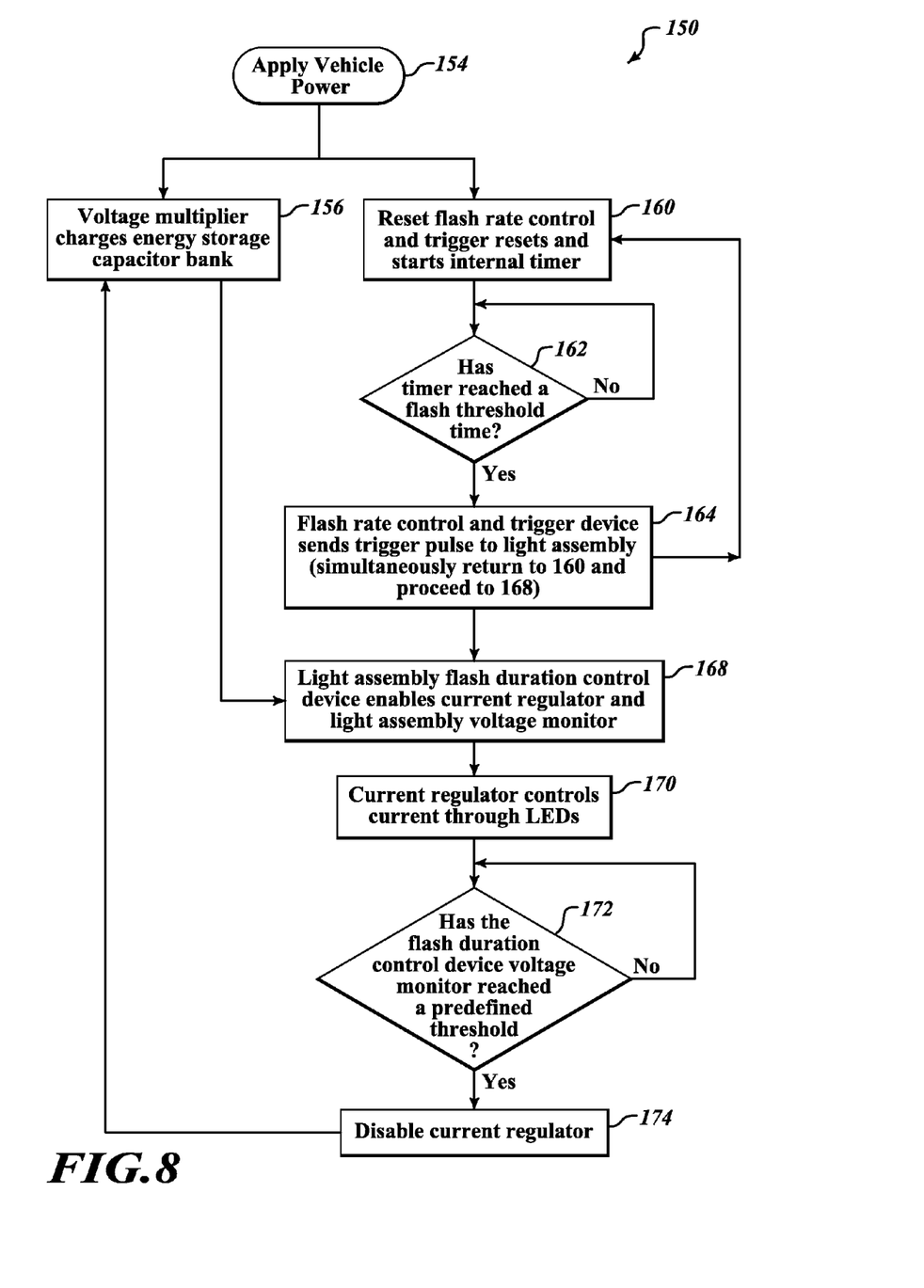
FIG. 8 is a flow diagram of an exemplary process performed by the system shown in FIG. 6.

FIG. 8 illustrates a flowchart of an exemplary process 150 performed by the system 20-1 shown in FIG. 6. First, at start symbol 154, power from the vehicle (e.g. aircraft, ground vehicle, submergible vessel, or surface vessel) is applied to the light system 20-1. At a block 156, the voltage multiplier 25 charges the capacitor bank 26. Simultaneously, at a block 160, the power supply flash rate control and trigger device 28 resets and starts a timer internal to the flash rate control and trigger device 28. Then, at a decision block 162, the power supply flash rate control and trigger device 28 determines when the timer has reached a predefined flash threshold time. If the timer has reached the predefined flash threshold time, then, at a block 164, the power supply flash rate control and trigger device 28 sends a trigger pulse to the light assembly 24. At a block 168, the flash duration control device 34-1 receives the trigger then enables the current regulator 30, thus causing the capacitor bank 26 to discharge. A voltage monitor in the flash duration control device 34-1 is enabled when the trigger is received. At a block 170, the enabled current regulator 30 controls current through the LEDs 32. Then, at a decision block 172, the flash duration control device 34-1 determines if the voltage monitor has reached a predefined threshold voltage. If the voltage monitor has reached the predefined threshold voltage, then at a block 174 the flash duration control device 34-1 disables the current regulator 30. Before the voltage monitor reaches the predefined threshold, the current regulator 30 controls current outputted by the discharging capacitor bank 26. The process 150 repeats for continued operation of the LED anti-collision light system 20.

The flash duration control devices may include microcontroller, Programmable Logic Device (PLD), discrete logic or analog circuitry.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
   storing electrical energy in a capacitor bank of a xenon light power supply;
   starting a first timer when the capacitor bank begins storing electrical energy;
   discharging the capacitor bank and transmitting a trigger signal to a light-emitting diode (LED) assembly when the first timer has reached a predefined threshold;
   at the LED light assembly,
      receiving the discharge from the capacitor bank;
      regulating current to one or more LEDs from the received discharge;
      performing at least one of beginning a second timer after receiving the trigger signal or enabling a monitor that monitors voltage of the received discharge; and
      when at least one of the second timer has reached a second predefined threshold or the monitored voltage has reached a predefined voltage value, disabling current to the one or more LEDs.

2. The method of claim 1, further comprising providing greater signal integrity by using a trigger return from the LED light assembly to the xenon light power supply.

3. The method of claim 1, wherein the xenon light power supply is an anti-collision light power supply.

4. A system comprising:
   a xenon power supply comprising:
      an electrical energy device; and
      a device configured to transmit a trigger signal after a predefined amount of time since at least one of previous discharge or beginning of initial charge of the electrical energy device; and
   a light-emitting diode (LED) light assembly comprising:
      one or more LEDs;
      a current regulator configured to receive the energy from the electrical energy device and regulate current to the LEDs based on LED requirements;
      at least one of a timer or a voltage monitor, the voltage monitor configured to monitor voltage of the received energy; and
      a processing device configured to:
         receive the trigger signal;
         perform at least one of reset and start the timer or activate the voltage monitor for monitoring voltage of the received energy from the electrical energy device upon reception of the trigger signal; and deactivate the current regulator when at least one of the timer has reached predefined threshold or the monitored voltage has reached a predefined voltage threshold.

5. The system of claim 4, wherein the xenon light power supply is an anti-collision light power supply.

6. The system of claim 5, wherein the system is located on an aircraft.

7. The system of claim 4, wherein the processing device is further configured to provide greater signal integrity by sending a trigger return to the xenon light power supply.

8. A system comprising:
   a xenon power supply comprising:
      a power supply;
      an energy storage device; and
      a device configured to transmit a trigger signal after a predefined amount of time since at least one of previous discharge or beginning of initial charge of the energy storage device; and
   a light-emitting diode (LED) light assembly comprising:
      one or more LEDs;
      a current regulator configured to receive the energy from at least one of the power supply or the energy storage device and regulate current to the LEDs based on LED requirements;
      at least one of a timer or a voltage monitor, the voltage monitor configured to monitor voltage of the received energy; and
      a processing device configured to:
         receive the trigger signal;
         perform at least one of reset and start the timer or activate the voltage monitor for monitoring voltage of the received energy from the electrical energy device upon reception of the trigger signal; and
         deactivate the current regulator when at least one of the timer has reached predefined threshold or the monitored voltage has reached a predefined voltage threshold.

9. The system of claim 8, wherein the xenon light power supply is an anti-collision light power supply.

10. The system of claim 9, wherein the system is located on an aircraft.

11. The system of claim 8, wherein the processing device is further configured to provide greater signal integrity by sending a trigger return to the xenon light power supply.

\* \* \* \* \*